United States Patent [19]
Asano

[11] Patent Number: 5,502,691
[45] Date of Patent: Mar. 26, 1996

[54] OPERATION PROHIBITION DEVICE FOR A CAR LOADING AUDIO INSTRUMENT

[75] Inventor: Michihiro Asano, Sagamihara, Japan

[73] Assignee: Nakamichi Corporation, Tokyo, Japan

[21] Appl. No.: 349,072

[22] Filed: Dec. 2, 1994

Related U.S. Application Data

[63] Continuation of Ser. No. 95,602, Jul. 21, 1993, Pat. No. 5,418,761.

[30] Foreign Application Priority Data

Jul. 29, 1992 [JP] Japan .................................. 4-222009
Jul. 29, 1992 [JP] Japan .................................. 4-222010

[51] Int. Cl.⁶ .................................................. H04B 1/20
[52] U.S. Cl. .................................................. 369/6; 455/345
[58] Field of Search ............................... 369/6, 7, 8, 10, 369/11, 12; 455/344, 345, 349; 340/825.32, 825.34, 426; 360/1, 5, 6, 7

[56] References Cited

U.S. PATENT DOCUMENTS

| | | | |
|---|---|---|---|
| 4,481,512 | 11/1984 | Tscheulin et al. | 340/825.25 |
| 4,710,907 | 12/1987 | Kobayashi et al. | 369/6 |
| 4,720,700 | 1/1988 | Seibold et al. | 340/825.32 |
| 5,063,611 | 11/1991 | Kitabayashi | 455/348 |
| 5,349,326 | 9/1994 | Yamada | 340/825.24 |

*Primary Examiner*—Georgia Y. Epps
*Assistant Examiner*—Tan Dinh
*Attorney, Agent, or Firm*—Pearne, Gordon, McCoy & Granger

[57] ABSTRACT

A car loading audio instrument adapted to be used by being connected to a car battery so that an electric power is supplied to the audio instrument and comprising a circuit breaker to break a circuit in a non-reversible manner in accordance with detection of robbery of the car loading audio instrument so that it is prohibited from being operated. A robbery is detected when two power lines supplying power are disconnected from each other.

9 Claims, 2 Drawing Sheets

OPERATION PROHIBITION DEVICE FOR A CAR LOADING AUDIO INSTRUMENT

This is a continuation of application Ser. No. 08/095,602, filed Jul. 21, 1993 and now U.S. Pat. No. 5,418,761.

BACKGROUND OF THE INVENTION

This invention relates to an improvement on an operation prohibition device for a car loading audio instrument serving that the audio instrument is prohibited from being operated after it is stolen.

There has been proposed an operation prohibition device for a car loading audio instrument adapted to be unable to operate the audio instrument after it is disconnected from a car battery when it is stolen as disclosed by U.S. Pat. No. 4,710,907, for example, which is owned by the applicant. The U.S. Patent discloses a preset recitation code number being input in order to release the prohibition of operation of the audio instrument. Japanese Laying-open No. 60-138645 discloses that the recitation code number can be voluntarily set by an operator.

In such conventional devices, a program of a microcomputer for controlling an operation of the audio instrument requires to input a preset recitation code number when it is connected to an electric power. Since the audio instrument is disconnected from a car battery when it is stolen, the preset recitation code number has to be input before the audio instrument should be operated after it is again connected to a car battery.

Thus, it will be understood that the conventional audio instrument never stores a condition on which it is stolen, but is adapted to be prohibited from being operated when it is connected to the car battery, which occurs when it is stolen. However, this occurs not only when it is stolen, but also when it is initially mounted on a car or when it is again connected to the car battery after the car is checked or arranged. It will be noted-that the recitation code number is essentially required when the audio instrument is again connected to the car battery after the car is checked or arranged.

In case that memories such as RAM used are of inexpensive volatile memory, a backup power source is required. Nonvolatile memories are more expensive than volatile ones.

SUMMARY OF THE INVENTION

Accordingly, it is a principal object of the invention to provide an operation prohibition device for a car loading audio instrument adapted to prevent the audio instrument from being unable to be operated when it is disconnected from a car battery, which is caused by other occurences than robbery.

It is another object of the invention to provide an operation prohibition device for a car loading audio instrument adapted to positively prohibit the audio instrument from being operated only after it is stolen.

In accordance with one aspect of the present invention, there is provided an operation prohibition device for a car loading audio instrument comprising;

at least two power supply lines extending from a car battery to said car loading audio instrument, but not through an accessory switch;

means to detect at least one of said two power supply lines being disconnected from said car battery;

and means to prohibit said audio instrument from being operated in accordance with detection of said at least one of said two power supply lines being disconnected.

With either or both of the power supply lines disconnected from the car battery when the car loading audio instrument is stolen, it is prohibited from being operated even though the accessory switch is turned on. Thus, it will be noted that the audio instrument is never prohibited from being operated when the audio instrument is disconnected from the car battery, but not when it is stolen and that it is positively prohibited from being operated when it is disconnected from the car battery by being stolen.

In accordance with another aspect of the invention, there is provided an operation prohibition device for a car loading audio instrument comprising;

means to detect said car loading audio instrument being stolen;

a circuit breaker to be cut so as to break a circuit in a non-reversible manner in accordance with said means to detect said car loading audio instrument being stolen;

means to detect whether said circuit breaker is cut or not;

and means to prohibit said car loading instrument from being operated in accordance with detection of said circuit breaker being broken.

With the circuit breaker cut only when the car loading audio instrument is stolen, the condition in which it is stolen is positively stored. Thus, it will be noted that the audio instrument is never prohibited from being operated when the audio instrument is again connected to the car battery after it is initially mounted on the car, but that it is positively prohibited from being operated when it is connected to the car battery after it is stolen.

BRIEF DESCRIPTION OF THE DRAWINGS

The above and other objects and features of the invention will be apparent from the description of the embodiment of the invention taken along with the accompanying drawings in which.

DETAILED DESCRIPTION OF THE EMBODIMENT

Figure 1:
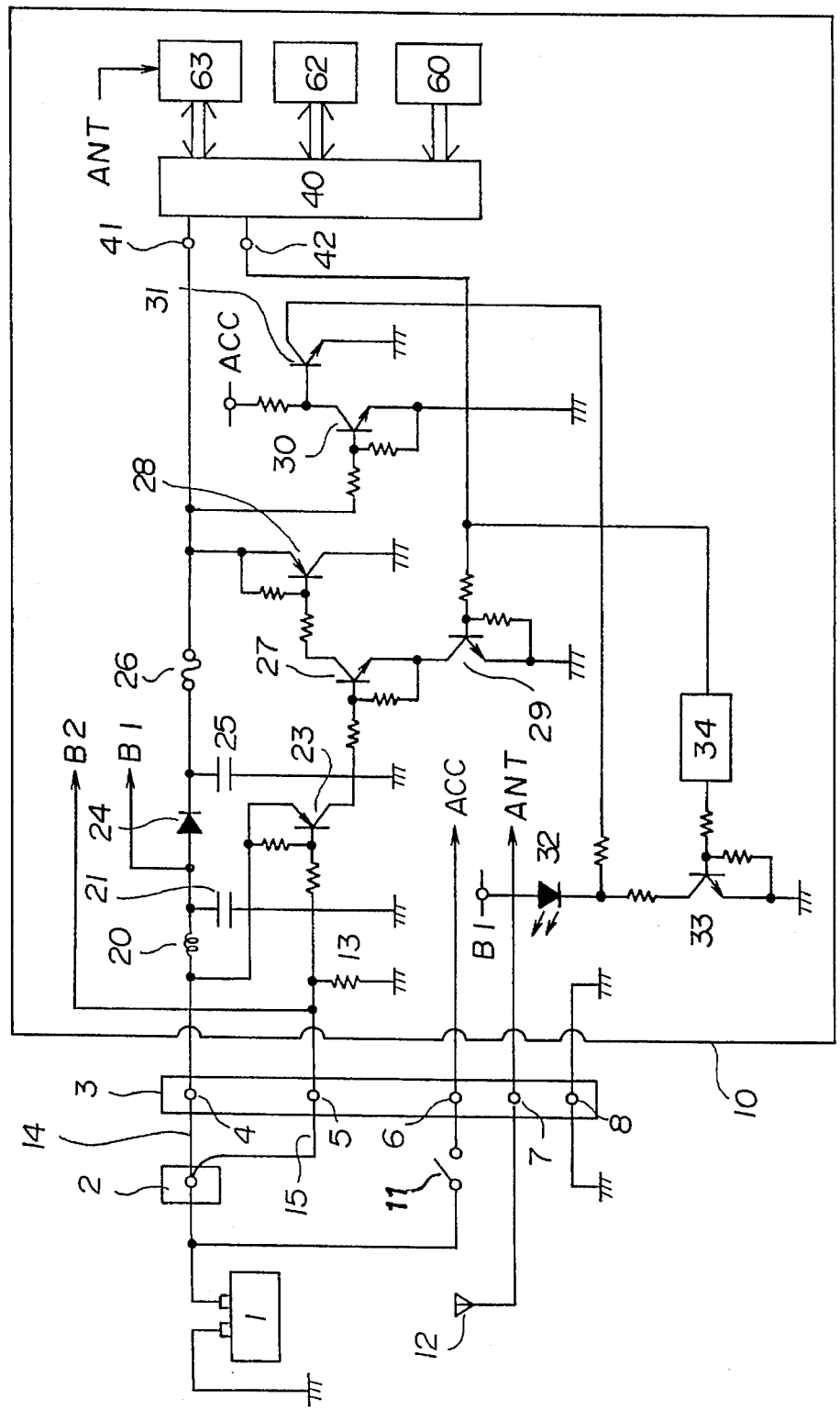
FIG. 1 is a schematic diagram of a circuit of a car loading tape recorder constructed in accordance with one embodiment of the invention.

Referring now to FIG. 1, there is shown a circuit of a car loading radio and tape recorder having an operation prohibition device constructed in accordance with one embodiment of the invention. A car battery 1 is connected through a dividing connector 2 and a connecting lead 14 to a terminal of a connector 3 and through a connecting lead 15 to a terminal 5 of the connector 3. The dividing connector 2 is disposed at a position such as an inside of a dashboard where it is never accessible. The car battery 1 is also connected through an accessory (ACC) switch 11 to a terminal 6 of the connector 3.

A terminal 7 of the connector 3 serves to connect an antenna 12 and a tape recorder 10 with each other and a terminal 8 of the connector 3 serves to connect ground to the car and ground to the tape recorder 10 with each other. Thus, the tape recorder 10 is connected directly through the terminals 4 and 5 to the car battery 1 and also through the ACC switch 11 and the terminal 6 to the car battery 1.

The terminal 4 of the connector 3 is connected to one end of a coil 20 disposed within the tape recorder 10 and also connected to an emitter of a transistor 23 while the terminal 5 of the connector 3 is connected to a base of the transistor 23. Thus, it will be noted that the transistor 23 is normally off because a voltage difference across the base and the emitter thereof is zero. Other end of the coil 20 is connected to one end of a capacitor 21, the other end of which is connected to ground. By the coil 20 and the capacitor 21 is formed a filter which serves to interrupt noise component from being introduced into the tape recorder 10 through a power source line.

Such a power source provided through the filter is supplied through a first power source line B1 to a tuner 63 and amplifiers which require a power source having no noise. A second power source line B2 extends from a connection point of the terminal 5 of the connector 3 and the base of the transistor 23 so that a power source is supplied to a mechanism 62 such as an electric motor have an tendency to be hardly effected by noise introduced into the power source line. The connection point between the terminal 5 and the transistor 23 is connected through a resistor 13 to ground.

An anode of a diode 24 is connected to the other end of the coil 20 while a cathode thereof is connected to one end of a capacitor 25, the other end of which is connected to ground. The cathode of the diode 24 is also connected to one end of an IC protector (referred to as ICP hereinafter) 26. The ICP 26 is an overcurrent protecting element which has the same function as a conventional fuse.

The ICP 26 may be one commercially available as tradename ICP-F10 from Rohm Corporation, for example, which has an appearance similar to those of semiconductors such as normal transistors. The ICP 26 serves to break in a non-reversible manner a circuit into which the ICP 26 is disposed in series thereto, when a current of more than predetermined value flows therethrough. The other end of the ICP 26 is connected to a robbery detecting terminal 41 described hereinafter.

A microcomputer 40 serves to control an operation of the tape recorder 10. It controls the mechanism 62 of the tape recorder 10 and the tuner 63 in accordance with instructions from an operating panel 60 including various operating switches.

A base of a transistor 27 is connected to a collector of the transistor 23 while a collector of the transistor 27 is connected to a base of a transistor 28. A collector of the transistor 28 is connected to ground while an emitter of the transistor 28 is connected to the other end of the ICP 26. A transistor 29 has a base connected to an alarm setting terminal 42 of the microcomputer 40 described hereinafter, a collector connected to an emitter of the transistor 27 and an emitter connected to ground. The alarm setting terminal 42 is maintained at "L" level on initialization of the microcomputer 40.

A transistor 30 has a base connected to the other end of the ICP 26, an emitter connected to ground and a collector connected through the ACC swicth 11 and the terminal 6 of the connector 3 to a power source line ACC which supplies an electric power to the tape recorder 10. The collector of the transistor 30 is also connected to a base of a transistor 31, an emitter of which is connected to ground. A collector of the transistor 31 is connected to a cathode of a light emitting diode 32 disposed on a front panel of the tape recorder 10. An anode of the light emitting diode 32 is connected to the power source line B1. The cathode of the light emitting diode 32 is also connected to a collector of a transistor 33, an emitter of which is connected to ground.

The alarm setting terminal 42 of the microcomputer 40 is connected to an oscillator 34 which generates pulses at a predetermined period. An output of the oscillator 34 is connected to a base of the transistor 33.

The microcomputer 40 can provide a robbery prevention mode to the tape recorder 10 by means of 16 predetermined operating keys. The robbery prevention mode can be provided by turning off the ACC switch 11 after both of a fast forwarding (FF) key and a rewinding (REW) key on the front panel of the tape recorder 10 are simultaneously pushed down, for example. At that time, the alarm setting terminal 42 of the microcomputer 40 is maintained at "H" level. The microcomputer 40 detects a voltage level of the robbery detecting terminal 41 everytime the ACC switch 11 is turned on.

An operation of the operation prohibition device of the invention will be described with reference to a flow chart of FIG. 2 hereinafter. In the normal condition of FIG. 1, the tape recorder 10 has the robbery prevention mode obtained by turning off the ACC switch 11 after the FF key and the REW key are simultaneously pushed down as illustrated in blocks 51 and 52 of FIG. 2. At that time, the alarm setting terminal 42 of the microcomputer 40 is at "H" level as shown in a block 53 of FIG. 2.

In the robbery prevention mode, the transistor 23 is turned off because of no voltage difference across the base and the emitter thereof. This causes the transistors 27, 28 and 31 to be turned off and the transitors 29 and 30 to be turned on. Since the alarm setting terminal 42 is at the state of "H" level, the oscillator 34 generates pulses having a predetremined period. Thus, the transistor 33 repeats being turning on and off in synchronization with the period of the pulses from the oscillator 34 so that the light emitting diode 32 flickers. This can appeal the robbery prevention mode of the tape recorder 10 to a robber through a window of the car.

Such a robber as knows the tape recorder having the robbery prevention mode selected cannot be used even though he steals it will lose a desire to steal it. Thus, it will be noted that the tape recorder can be positively prevented from being stolen.

A case in which the tape recorder 10 is stolen even though the light emitting diode 32 flickers will be described herein just below. The robber will invade the car by a suitable method. Thereafter, he will remove the tape recorder 10 from the car by unfastening screws and nuts which fasten the tape recorder 10 on the car and then remove the connector 3 which connects the tape recorder 10 to the car or cut the connecting leads 14 and 15.

In case that the connector 3 is removed, the base and the emitter of the transistor 23 are broken from each other because of the connector 3 being removed. Thus, the base of the transistor 23 is at ground level through a resistor 13, which causes the transistor 23 to be turned on. Since the transistror 29 is already at the on-state, the transistor 27 is also turned on.

By turning on the transistors 27 and 29 is turned on the transistor 28, which causes the other end of the ICP 26 to be rapidly at ground level. Thus, an overcurrent discharges from the capacitors 21 and 25 through the ICP 26. This causes the ICP 26 to be cut so that the circuit into which the ICP 26 is disposed is broken. It should be noted that the overcurrent from the capacitors 21 and 25 flows through the ICP 26 only for a discharging time, but that the ICP 26 can be broken only for approximately 0.1 second. Thus, it will be noted that the capacitors 21 and 25 may be of such capacitance as can hold such a breaking time.

In case that the robber cuts the connecting lead 15 extending between the connector 2 and the terminal 5 of the connector 3, the base of the transistor 23 is at ground level through the resistor 13 because of no connection between the base of the transistor 23 and the car battery 1. This causes the transistor 23 to be turned on and also the transistor 27 to be turned on because of the transistor 29 being turned on.

By turning on the transistors 27 and 29 is turned on the transistor 28, which causes the other end of the ICP 26 to be rapidly at ground level. Thus, an overcurrent from the car battery through the connecting lead 14 remaining connected flows through the coil 20 and the diode 24 and then through the ICP 26. Thus, the ICP 26 is immdeiately broken.

In case that the robber cuts the connecting lead 14 extending between the connector 2 and the terminal 4 of the connector 3, the capacitor 21 holds a voltage applied across both ends thereof for a while even after the connecting lead 14 is cut. Thereafter, as the connecting lead 15 extending between the connector 2 and the terminal 5 of the connector 3 is cut, the transistor 23 is turned on because of the base thereof being at ground level through the resistor 13. Thus, a current flowing from the capacitor 21 through the coil 20 and the transistor 23 turns on the tranistor 27.

The transistor 28 is turned on by the turned-on transistor 27. Since the alarm setting terminal 42 is at "H" level, the transistor 29 is turned on. Thus, a current from the capacitor 21 flows through the diode 24, the ICP 26 and the transistor 28 to ground. The discharged current breaks the ICP 26 so that the circuit is cut.

After the capacitor 21 is disconnected from the car battery 1 by cutting the connecting lead 14, a small amount of current tends to flow from the capacitor 21 through the power source line B1 to the amplifiers and the tuner 63 so that a voltage across both ends of the capacitor 21 is gradually lowered. Thus, it will be considered that a breaking current cannot flow through the ICP 26 because of the voltage across the terminals of the capacitor 21 being lowered, which will fearfully occur when it takes substantial time that the connecting lead 15 is cut after the connecting lead 14 is cut.

However, since the capacitor 25 is connected in parallel to the capacitor 21 and also since the diode 24 is disposed between the the ICP 26 and the capacitor 21 so that the capacitor 25 is never discharged through the power source line B1, the capacitor 25 has voltage drop lower than the capacitor 21 has. Thus, it will be noted that the breaking current can positively flow through the ICP 26 by a cooperation of the capacitors 21 and 25 when the connecting lead 15 is cut.

It will be considered that the terminal voltages of the capacitors 21 and 25 are lowered so that a predetermined amount of breaking current cannot flow through the ICP 26. This will occur when it takes substantially long time that the connecting lead 15 is cut after the connecting lead 14 is cut. However, since the robber tends to steal the tape recorder 10 as soon as possible, the voltage drop of the capacitors 21 and 25 during 16 such a long time will be negligible.

In this manner, as the connector 3 is removed or the connecting leads 14 and 15 are cut when the tape recorder 10 is stolen, the ICP 26 is broken. Therefore, even though the stolen tape recorder 10 is mounted on a car and the ACC switch 11 is turned on as shown in a block 55 in FIG. 2, the tape recorder 10 cannot be operated. That is because the microcomputer 40 controls the alarm setting terminal 42 to be at "L" level as shown in a block 56 in FIG. 2 and then detects the level of the robbery detection-terminal 41 as shown in a block 57 in FIG. 2, but the robbery detection terminal 41 is maintained at "L" level because of the ICP 26 being broken. Thus, the microcomputer 40 is never operated by all the keys on the panel of the tape recorder 10, which prohibits the tape recorder 10 from being operated as shown in a block 58 in FIG. 2.

Since the ICP 26 is broken when the ACC switch 11 is turned on, the transistor 30 is turned off. This causes the transistor 31 to be turned on and therefore the cathode of the light emitting diode 32 to be at ground level. Thus, the light emitting diode 32 continues to be lighted, which indicates that the tape recorder 10 is in the condition of being prohibited from being operated.

If the robber can replace the broken ICP 26 by a new ICP, the tape recorder 10 will be able to be operated. Even though the robber has a knowledge of electricity, since the tape recroder 10 normally has many ICPs for protection of the circuits and complicated appearances, he will be unable to determine whether the ICP 26 is broken or not. Also, since the ICP 26 has an appearance similar to those of semiconductors such as transistors, the ICP 26 will be practically unable to be replaced unless he knows the detailed construction of the circuits.

Figure 2:
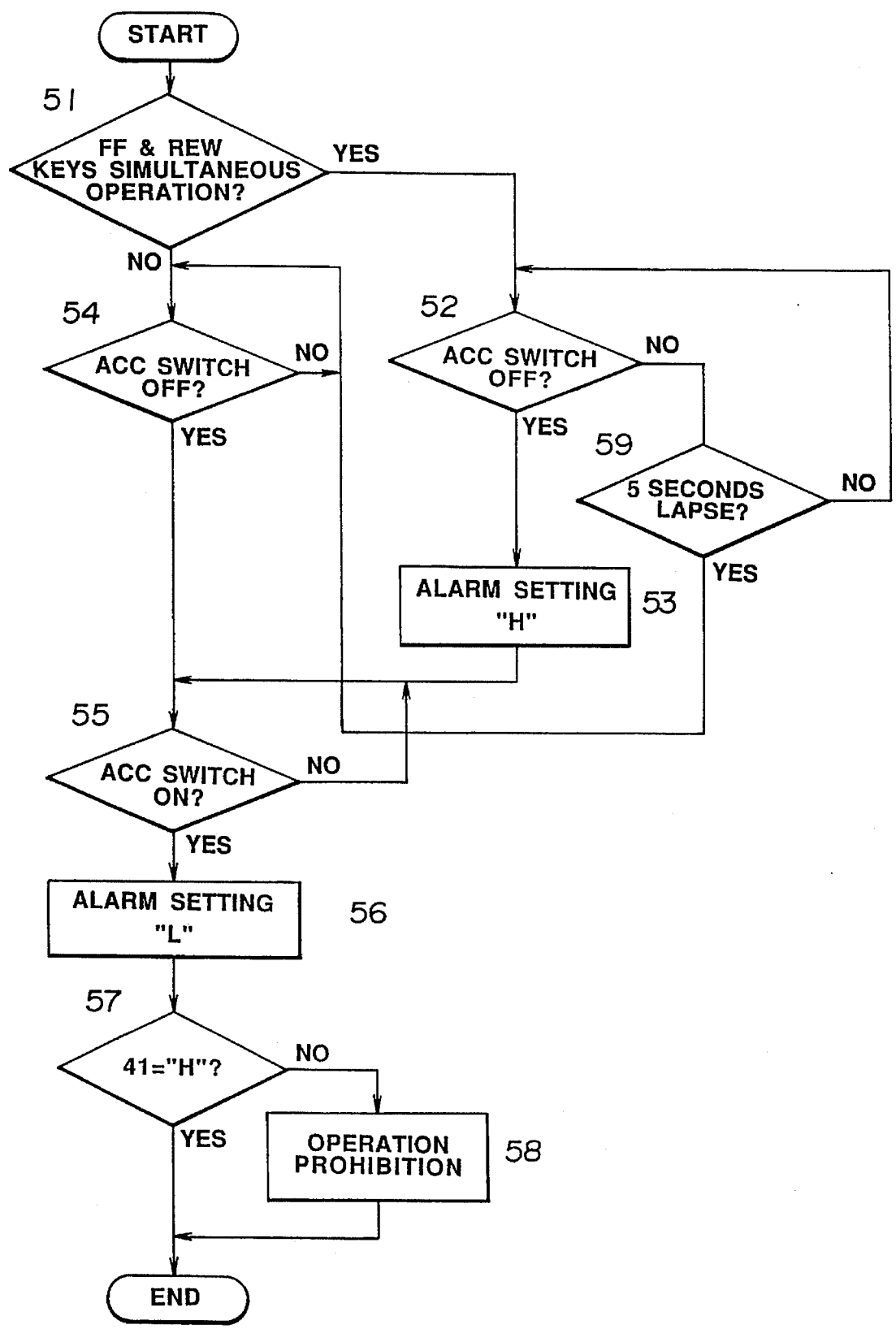
FIG. 2 is a flow chart illustrating an operation of the operation prohibition device of the invention.

In the condition that the robbery protection mode is not set because the FF key and the REW key are not simultaneously pushed down as shown in-the block 51 in FIG. 2, even though the ACC switch 11 is turned off as shown in a block 54 in FIG. 2, the alarm setting terminal 42 is maintained at "L" level. Thus, the oscillator 34 generates no pulses, which causes the light emitting diode 32 to be maintained at the state of being turned off.

In this condition, as the robber removes the connector 3, the transistors 23, 27 and 28 are turned off because of the transistor 29 being off. Thus, no overcurrent flows through the ICP 26, which causes the ICP 26 to be never broken. Since the robbery protection mode is not set, the tape recorder 10 can be normally operated when the tape recorder 10 is connected to a car battery after it is stolen. In the condition that the robbery protection mode is not set, even though the ACC switch 11 is turned off and the connector 3 is removed when the tape recorder 10 is removed for being repaired, the ICP 26 is never broken. Thus, it will be noted that when the repaired tape recorder 10 is again mounted on the car and connected to the car battery 1, it can be normally operated.

After the FF key and the REW key are simultaneously pushed down as shown in the block 51 in FIG. 2, 5 seconds lapse without turning off the ACC switch 11 as shown in the block 52 and a block 59 in FIG. 2, which regards no simultaneous operation of the FF key and the REW key to be made. Thus, even though the the ACC switch 11 is turned off, the alarm setting terminal 42 is maintained at "L" level as shown in the blocks 54, 55 and 56 in FIG. 2.

When the car battery is to be replaced, the connecting leads are removed from the terminals of the car battery. In this case, since the base and the emitter of the transistor 23 are connected to each other through the connector 2 and the voltage across the capacitor 21 is applied to the base and the emitter of the transistor 23, the transistor 23 is never turned on and as a result the ICP 26 is never broken.

Although a single embodiment of the invention has been described and illustrated with reference to the accompanying drawings, it will be understood by those skilled in the art that it is by way of example, and that various changes and modifications may be made without departing from the spirit and scope of the invention.

For example, although, in the aforementioned embodiment, after it is detected that the two power supply lines are cut, the IC protector is broken by the overcurrent flowing therethrough so that the audio instrument is prohibited from being operated, it may be unable to be operated unless the recitation code number is input.

Furthermore, although, in the aforementioned embodiment, two power supply lines are connected to the single connector, they may be connected to respective connectors.

Although, in the aforementioned embodiment, an IC protector is used as means to detect and store that the audio instrument is stolen, there may be used a conventional glass tube type fuse, which may be preferably of such a type as is broken with a small amount of current and/or as be rapidly broken. However, in case that such a glass tube type fuse is used, the condition of the fuse being broken can be visibly acknowledged. Thus, the robber can disadvantageously replace the broken fuse by a new one so that the tape recorder can be operated.

That is why the IC protector is preferably used because whether it is broken or not cannot be visibly aknowledged and it cannot be replaced unless the robber has the knowledge of electricity as aforementioned.

Actuators for switches may be provided in a case of the tape recorder so that the switches have states changed when the audio instrument is removed from the car and the circuit breaker is broken in accordance with the change of states of the switches.

Thus, it should be understood that this invention is defined only to the appended claims.

What is claimed is:

1. An operation prohibition device for a car loading audio instrument comprising;

at least two power supply lines connected together and extending from a car battery to said car loading audio instrument, but not through an accessory switch;

means to detect said two power supply lines being disconnected from each other;

and means to prohibit said car loading audio instrument from being operated when said means to detect said two power supply lines being disconnected detects said two power supply lines being disconnected from each other to provide a prohibition instruction to said instrument.

2. An operation prohibition device for a car loading audio instrument as set forth in claim 1, and said means to detect said two power supply lines being disconnected from each other comprises a circuit breaker.

3. An operation prohibition device for a car loading audio instrument as set forth in claim 2, and said circuit breaker comprises an IC protector.

4. An operation prohibition device for a car loading audio instrument as set forth in claim 2, and said means to detect said two power supply lines being disconnected from each other comprises at least one capacitor charged through one of said two power supply lines and means to detect a voltage difference between said two power supply lines.

5. An operation prohibition device for a car loading audio instrument as set forth in claim 4, and said means to detect said two power supply lines being disconnected from each other further comprises a semiconductor switch which is turned on when said two power supply lines are disconnected from each other and through which overcurrent through said circuit breaker flows from said at least one capacitor.

6. An operation prohibition device for a car loading audio instrument as set forth in claim 1, and said means to detect said two power supply lines being disconnected from each other comprises a plurality of capacitors charged through one of said two power supply lines, means to interrupt a downstream one of said adjacent capacitors from being discharged and means to detect a voltage difference between said two power supply lines.

7. An operation prohibition device for a car loading audio instrument as set forth in claim 6, and said means to detect said two power supply lines being disconnected from each other further comprises a semiconductor switch which is turned on when said two power supply lines are disconnected from each other and through which overcurrent through said circuit breaker flows from said capacitors.

8. An operation prohibition device for a car loading audio instrument as set forth in claim 1, and said two power supply lines are connected to each other through a connector for connecting said car loading audio instrument with said car whereby said means to detect said two power supply lines being disconnected from each other is operated when said connector is disconnected.

9. An operation prohibition device for a car loading audio instrument as set forth in claim 1, and further comprising means to set a robbery prevention mode in which said means to detect said two power supply lines being disconnected from each other is operated.

* * * * *